(12) United States Patent
Lewandowski et al.

(10) Patent No.: US 10,623,474 B2
(45) Date of Patent: Apr. 14, 2020

(54) TOPOLOGY GRAPH OF A NETWORK INFRASTRUCTURE AND SELECTED SERVICES STATUS ON SELECTED HUBS AND NODES

(71) Applicant: INTERNATIONAL BUSINESS MACHINES CORPORATION, Armonk, NY (US)

(72) Inventors: Marcin R. Lewandowski, Cracow (PL); Marcin Pacult, Cracow (PL); Janusz A. Rejduch, Cracow (PL); Kamil Zydek, Cracow (PL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 91 days.

(21) Appl. No.: 15/193,178

(22) Filed: Jun. 27, 2016

(65) Prior Publication Data

US 2017/0373946 A1 Dec. 28, 2017

(51) Int. Cl.
*H04L 29/08* (2006.01)
*H04L 12/24* (2006.01)

(52) U.S. Cl.
CPC .......... *H04L 67/10* (2013.01); *H04L 41/0631* (2013.01); *H04L 41/145* (2013.01); *H04L 41/5096* (2013.01)

(58) Field of Classification Search
CPC ....................................................... H04L 41/22
See application file for complete search history.

(56) References Cited

U.S. PATENT DOCUMENTS

| | | | |
|---|---|---|---|
| 7,366,108 B2 | 4/2008 | Szentesi et al. | |
| 7,453,796 B2* | 11/2008 | Alicherry | H04J 3/14 370/218 |
| 8,194,570 B2 | 6/2012 | Mohamed et al. | |
| 8,878,852 B1 | 11/2014 | Klein et al. | |
| 8,996,932 B2 | 3/2015 | Singh et al. | |
| 9,491,059 B2 | 11/2016 | Fletcher et al. | |
| 2014/0304407 A1* | 10/2014 | Moon | H04L 43/045 709/224 |

(Continued)

FOREIGN PATENT DOCUMENTS

| | | |
|---|---|---|
| WO | 2013062585 A1 | 5/2013 |
| WO | 2014158066 A1 | 10/2014 |

OTHER PUBLICATIONS

Spanning Tree (Wikipedia, Sep. 18, 2015).*

(Continued)

*Primary Examiner* — Nicholas P Celani
(74) *Attorney, Agent, or Firm* — Cantor Colburn LLP; Alexander Jochym

(57) ABSTRACT

A computer-implemented method for identifying a source of a failure in a network is provided. The method includes receiving hardware infrastructure information of the network, wherein the network includes a plurality of hardware infrastructure units, and receiving software services information of the network. The method also includes associating the hardware infrastructure information with the software services information, and generating a graph based on the association of the hardware infrastructure information and the software services information.

15 Claims, 8 Drawing Sheets

(56) References Cited

U.S. PATENT DOCUMENTS

2014/0379851 A1* 12/2014 LeCroy ................. H04L 67/02
 709/217
2015/0052402 A1 2/2015 Gurumurthy et al.
2015/0221109 A1* 8/2015 Klein ................. H04L 43/0811
 345/440

OTHER PUBLICATIONS

Mel et al., "The NIST Definition of Cloud Computing" IST Special Publication 800-145, Sep. 2011; pp. 1-7.
Samak et al., "Failure Analysis of Distributed Scientific Workflows Executing in the Cloud", IEEE 2012, 8th Int'l Conference on network and service management (cnsm) and 2012 workshop on systems virtualiztion management (svm); pp. 46-54.

* cited by examiner

TOPOLOGY GRAPH OF A NETWORK INFRASTRUCTURE AND SELECTED SERVICES STATUS ON SELECTED HUBS AND NODES

BACKGROUND

The present invention relates to generating a topology graph, and more specifically, to a topology graph of network infrastructure and selected services status on selected hubs and nodes.

Typical cloud infrastructures contain many physical and virtual machines cooperating in a complicated topology to provide various cloud services to its users. The services are generally unaware of the hardware functionality of the infrastructure, making it difficult to implement any way of handling faults. Failures in providing services to cloud users can be caused for various reasons stemming from failed hardware infrastructure components, unavailable services, or connection issues.

Network administrators and cloud users on different levels need to be able to efficiently access exhaustive information about the network infrastructure and services. Information regarding the infrastructure and its relationships can be acquired by using various queries and remote protocols, however conventional techniques collect the topology information and service information in a non-integrated manner. In addition, delays in retrieving information can lead to unsynchronized states where deficiencies in synchronized information about the distributed infrastructure result in unavailable services and unreachable nodes. The inability to synthesize the information adds challenges to the ability of an administrator or user when attempting to identify the reason for the failure in the network. In addition, the collected data from the various queries and protocols must be synchronized to provide reliable status information of the network and cloud service instance.

SUMMARY

According to one or more embodiments of the present invention, a computer-implemented method for identifying a source of a failure in a network is provided. The method includes receiving hardware infrastructure information of the network, wherein the network includes a plurality of hardware infrastructure units, and receiving software services information of the network. The method also includes associating the hardware infrastructure information with the software services information, and generating a graph based on the association of the hardware infrastructure information and the software services information.

According to one or more embodiments of the present invention, a computer program product for identifying a source of a failure in a network, the computer program product comprising a computer readable storage medium having program instructions embodied therewith, the program instructions executable by a processor is provided. The computer program product includes receiving infrastructure information of the network, wherein the network includes a plurality of hardware infrastructure units, and receiving software services information of the network. The computer program product also includes associating the hardware infrastructure information with the software services information, and generating a graph based on the association of the hardware infrastructure information and the software services information.

According to one or more embodiments of the present invention, a system for identifying a source of a failure in a network is provided. The system includes a memory coupled to a processor, the processor being configured to receive hardware infrastructure information of the network and to receive software services information of the network. The processor of the system is further configured to combine the hardware infrastructure information with the software services information, and generate a graph consolidating the hardware infrastructure information with the software services information.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
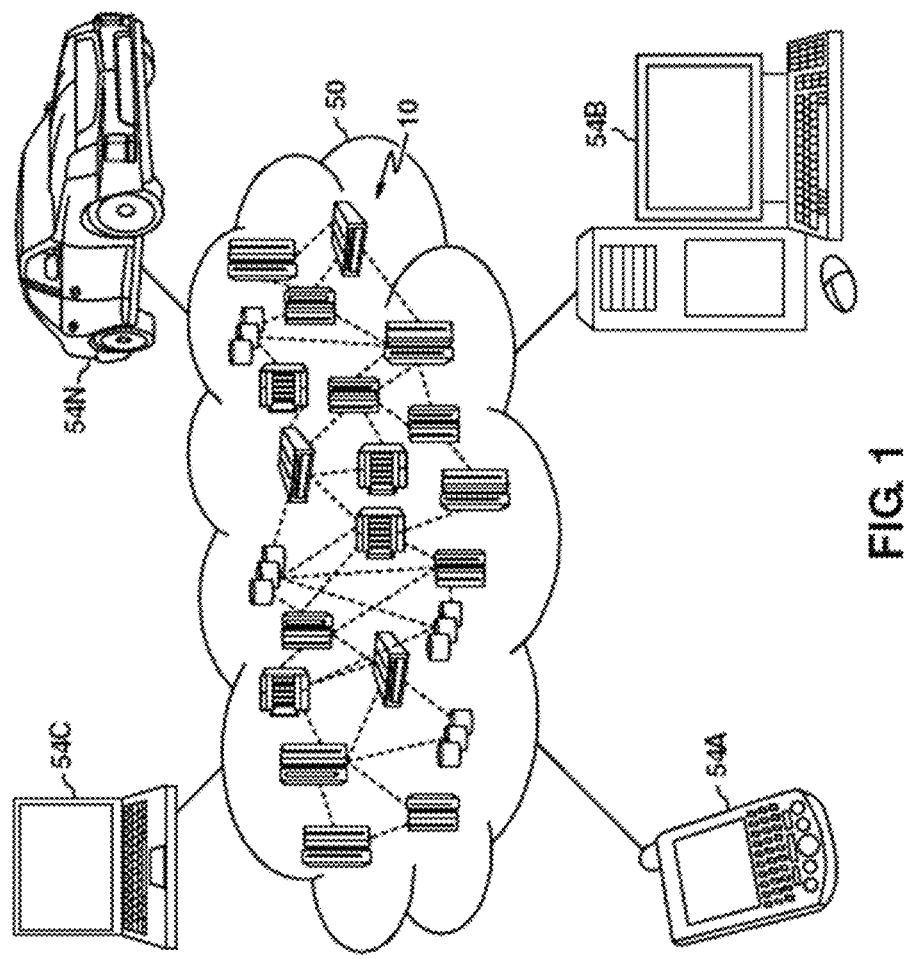
FIG. 1 depicts a cloud computing environment according to one or more embodiments of the present invention.

In accordance with exemplary embodiments of the disclosure, methods, systems and computer program products for identifying a source of a failure in a network are provided.

In one or more exemplary embodiments, a combination of queries and remote protocols are utilized to gather information regarding the cloud services and hardware infrastructure of a network where the information is used to generate a graphical representation. The graphical representation consolidates the received information, and in one or more embodiments the graphical representation is a topology graph. In one or more embodiments, the topology graph defines relationships between the hardware units of the network and software components in the infrastructure.

In one or more embodiments, the source of failure is identified on a topology graph showing which particular component or relation is not in the required state. In one or more embodiments, the source of failure or vulnerability in the network is identified by computing an effective software service status information. In some embodiments, the effective software service status information is computed based on a computing a maximum spanning tree rooted at a selected software service. The maximum spanning tree is computed for each identified software service provided by the infrastructure. In one or more embodiments, the effective software service status information with a highest severity is selected as a vulnerable point or failure point in the network. In one or more embodiments, the generated graph and relevant status information is provided to a user or network administrator.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
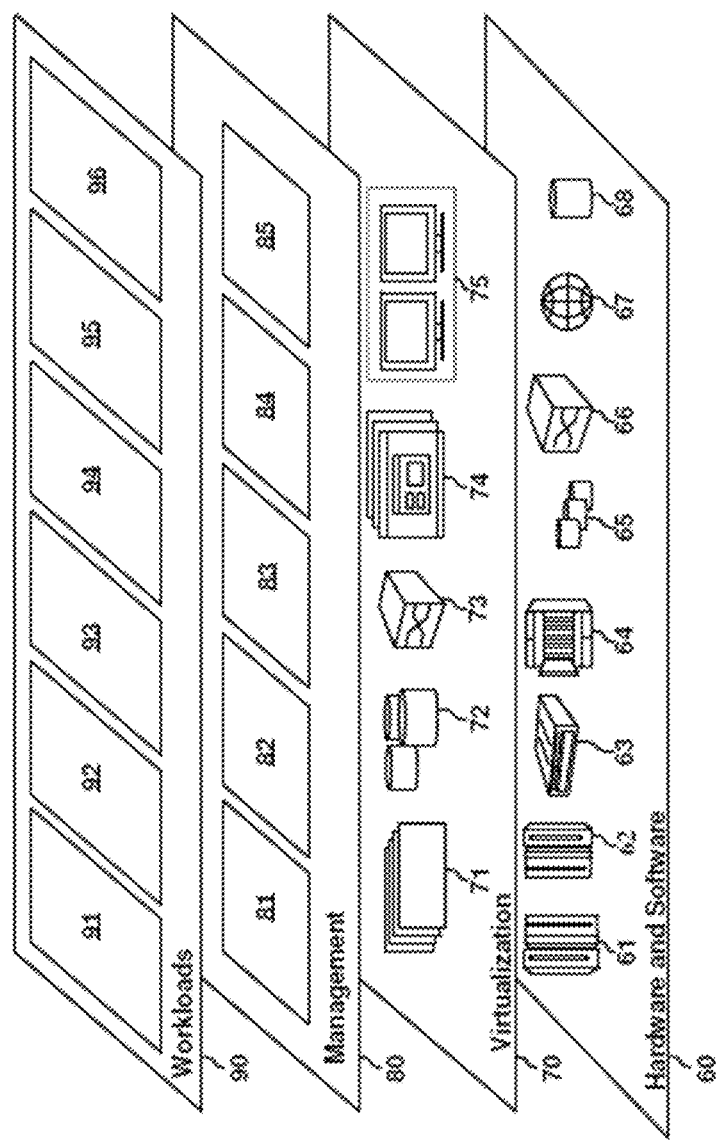
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Figure 3:
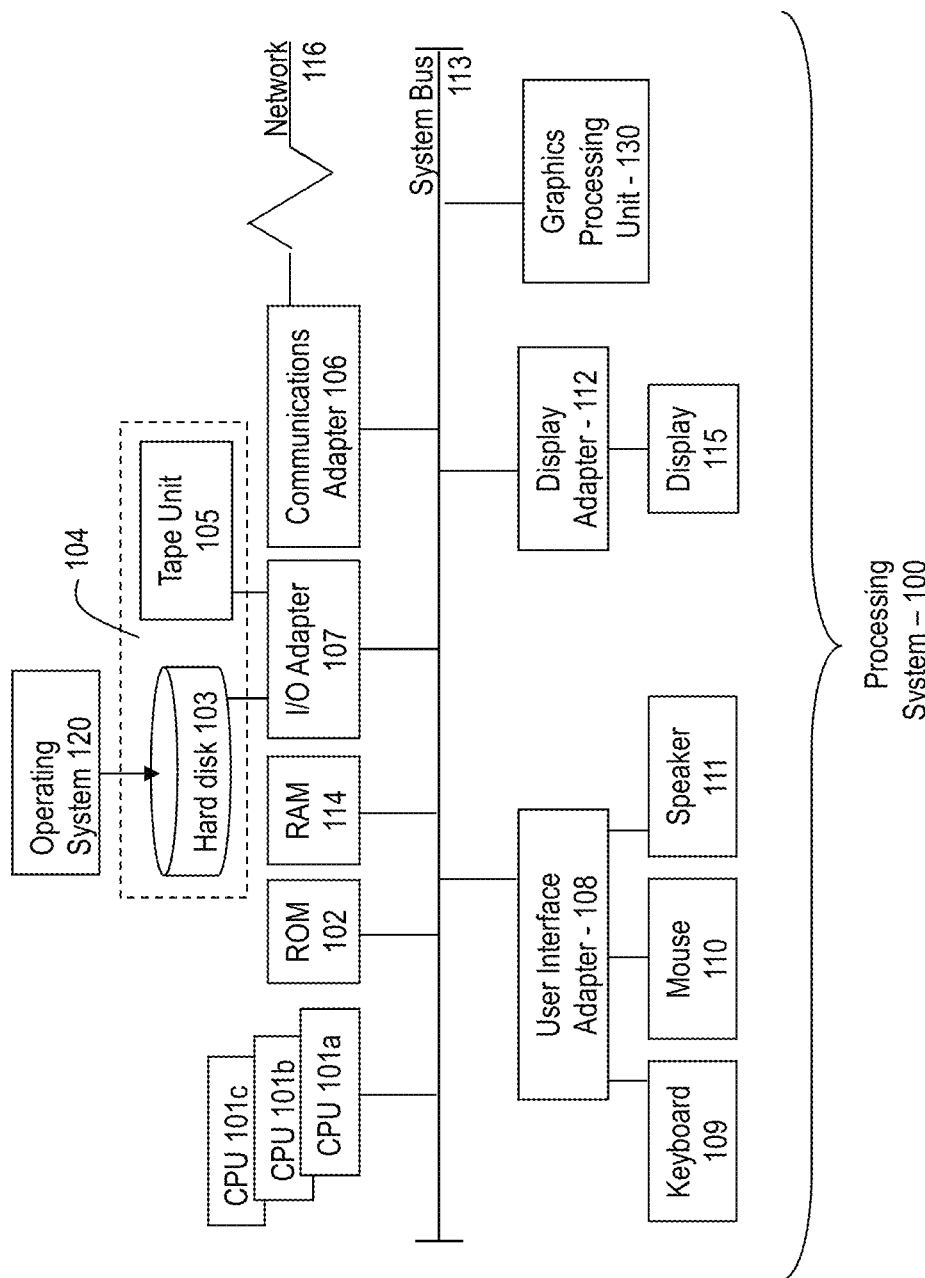
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figures 4A, 4B:
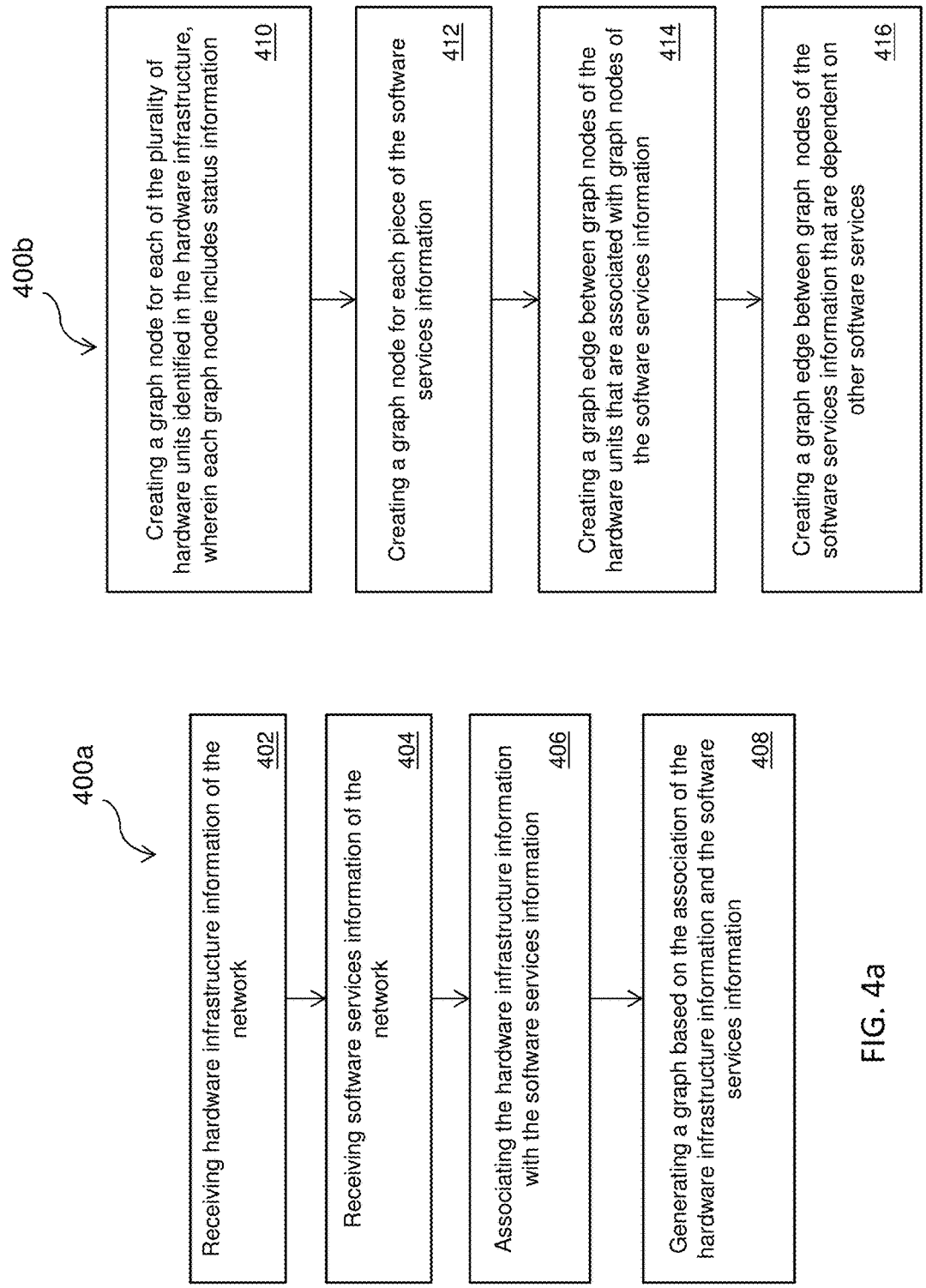
FIGS. 4a, 4b, and 5 illustrate a block diagram of a topology graph of a network infrastructure and selected services status on selected hubs and nodes.

Now referring to FIG. 4, a flow diagram 400 for generating a topology graph of a network infrastructure and selected services status on selected hubs and nodes is provided. Block 402 includes receiving hardware infrastructure information of the network. In one or more embodiments, the hardware infrastructure includes bridges, routers, switches, servers, and the like. In one more embodiments, the hardware infrastructure information can be received from a protocol or hardware monitoring system while in other embodiments the hardware infrastructure information can be received from a report or from a database. In one or more embodiments, hardware monitoring protocols and/or systems include, but are not limited to, Intelligent Platform Management Interface (IPMI) and Simple Network Management Protocol (SNMP). The hardware infrastructure information can also be obtained using various queries or protocol messages. In a different embodiment, the received hardware infrastructure information includes data and status information. The hardware infrastructure data includes information such as CPU utilization, memory consumption, requests/sec latency and request counts. Other data includes information such location information, network connectivity, power system connectivity, temperature, and the like. The hardware infrastructure status information includes information indicating the operability, connectivity, or availability of the hardware unit. In an exemplary embodiment, an Available or ON status would indicate a properly operating hardware unit and an Unavailable or OFF status would indicate a hardware unit that is offline. Other types of state information are envisioned to be within the scope of the disclosure.

Block 404 provides receiving software services information of the network. Software services can be discovered by using various queries. The types of queries depend on the different types of services being used in the network. Examples of different queries can include querying a list of hypervisors for a compute service, retrieving a host name of a hypervisor, querying physical network names for an external network, and the like. In one or more embodiments the software service information is received from an Infrastructure-as-a-Service system application programming interface. The software services information provides information regarding the types of services that are available in the network and the relationship between the offered services such as a dependent relationship among the services. In other embodiments, the software service information may be provided by a report or stored information. Block 406 includes associating the hardware infrastructure information with the software services information. In one or more embodiments, the association can be stored in a memory, database, or server.

Block 408 provides generating a graph based on the association of the received hardware infrastructure information and the received software services information. In one or more embodiments, the graph provides a consolidated view of the topology and software services information. In one or more embodiments, the graphs can be generated when a change in the infrastructure and/or service is detected. In other embodiments, the graphs are updated on a periodic basis wherein the periodic interval can be configured by an administrator or user.

Block 410 of FIG. 400b includes creating a graph node for each of the plurality of hardware units identified in hardware infrastructure of the network, wherein each graph node includes status information of each of the respective hardware units. In one or more embodiments, the graph nodes include other diagnostic information such as any combination of a serial number, asset type, asset vendor, power status, location, and the like.

Block 412 includes creating a graph node for each piece of the software services information. In one or more embodiments, a graph node for a software service represents a computing service and another graph node represents an imaging service. It is known to one having ordinary skill in the art that other types of cloud services are within the scope of the disclosure.

Block 414 provides creating a graph edge between graph nodes of the identified hardware units that are associated with graph nodes of the software services information. The graph edge indicates an existing relationship between the hardware units and software services. For example, a computing service may operate over a hardware infrastructure that includes a server, host, and gateway which can be illustrated with the graph nodes and graph edges of the topology.

Block 416 includes creating a graph edge between graph nodes of the identified software services information that are dependent on other software services. The graph edge indicates an existing relationship between software services. In one or more embodiments, the dependency between the software services can be identified by specific IaaS implementation architecture. In a different embodiment, the dependency between software services can be revealed by reports, information stored in database or server, or API queries. In other embodiments, reconciliation mechanisms can be used to obtain the dependency information between the software services. Such reconciliation mechanisms include algorithms that obtain hypervisor hostnames from a computer server, and/or algorithms that obtain physical network name from software-defined external network.

Figure 5:
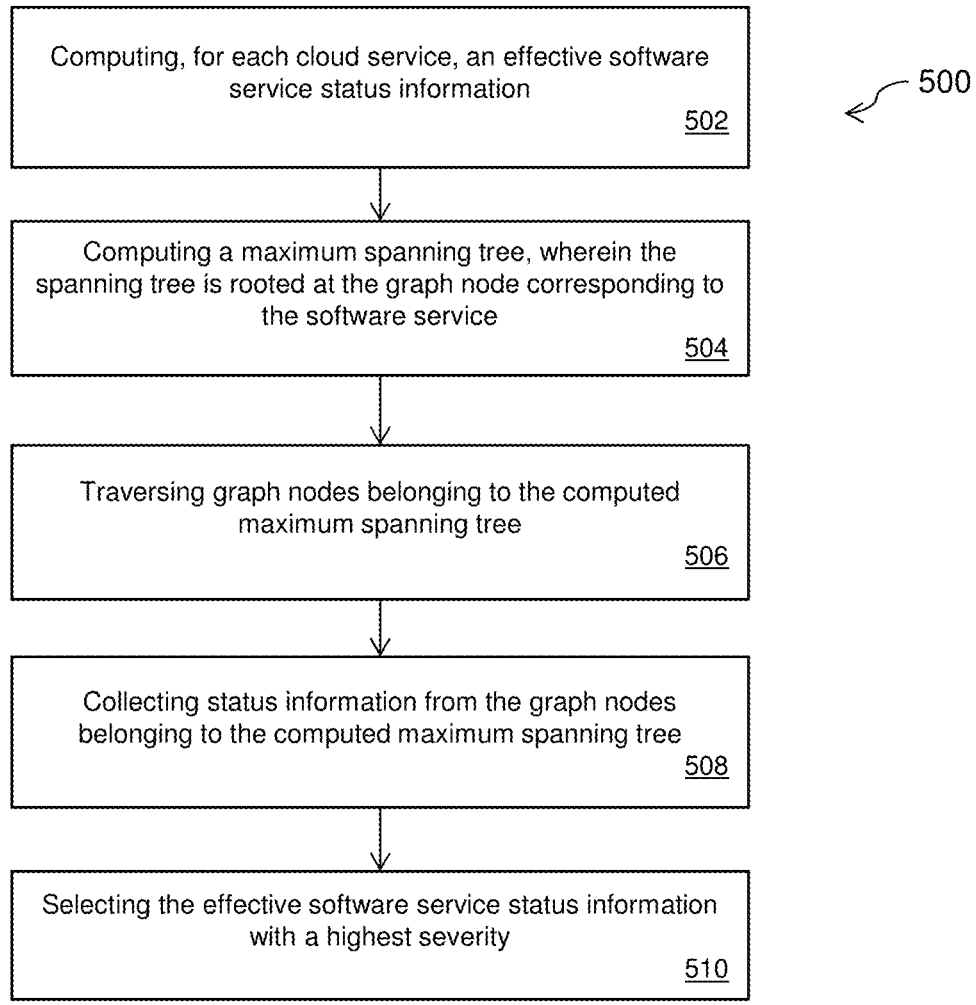

Now referring to FIG. 5, a block diagram 500 for generating a topology graph of a network infrastructure and selected services status on selected hubs and nodes is shown. Block 502 includes for each identified software service, computing an effective software service status information. In one or more embodiments, the effective software service status information is indicative of the service be in an ON state or OFF state. The ON state provides that the software service is operational and available. The OFF state provides the software service is unavailable or offline.

Block 504 includes computing a maximum spanning tree, wherein the spanning tree is rooted at the graph node corresponding to the software service. Block 506 includes traversing the graph nodes belonging to the computed maximum spanning tree. Block 508 provides collecting status information from the graph nodes belonging to the computed maximum spanning tree.

Block 510 includes selecting the graph node having the effective status information with a highest severity. In one or more embodiments, the severity is indicative of a failure point in the software service and/or hardware infrastructure and the severity information can indicate a normal, error, or warning. The effective status information and topology graph can be provided to a user or network administrator to implement further trouble shooting or failure recovery measures.

Figure 6:
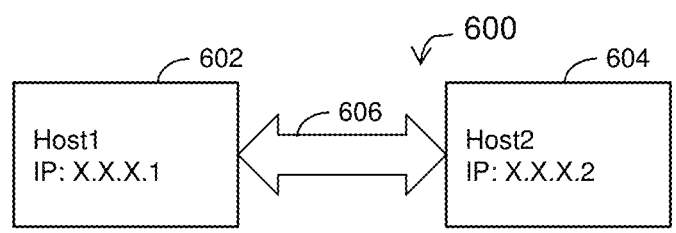
FIGS. 6, 7, 8, 9, and 10 illustrate a block diagram of a system for a topology graph of a network infrastructure and selected services status on selected hubs and nodes.

FIG. 6 illustrates a system 600 for generating a topology graph. System 600 includes a first Host1 602 and a second Host2 604. The two hosts are connected through a network 606 and can be configured to communicate by using TCP/IP protocol. In one or more embodiments, Internet Control Message Protocol (ICMP) can be used to confirm the hosts are online and available in the network 606. Host 1 602 is reachable by Internet Protocol (IP) address X.X.X.1 and Host 2 604 is reachable by IP address X.X.X.2.

Figure 7:
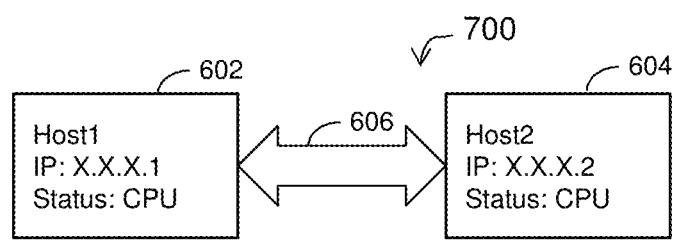

FIG. 7 illustrates a system 700 and depicts Host1 602 and Host2 604 being connected over network 606. In an exemplary embodiment, the status information of the hardware units (CPU) has been obtained. The status information of the CPU can indicate the utilization of CPU in relation to its maximum capability. In one or more embodiments, the hardware unit status information can be discovered by scripts executed by secured shell SSH protocol. It is known to one having ordinary skill in the art that other types of messaging or protocols can be used to acquire the hardware status information.

Figure 8:
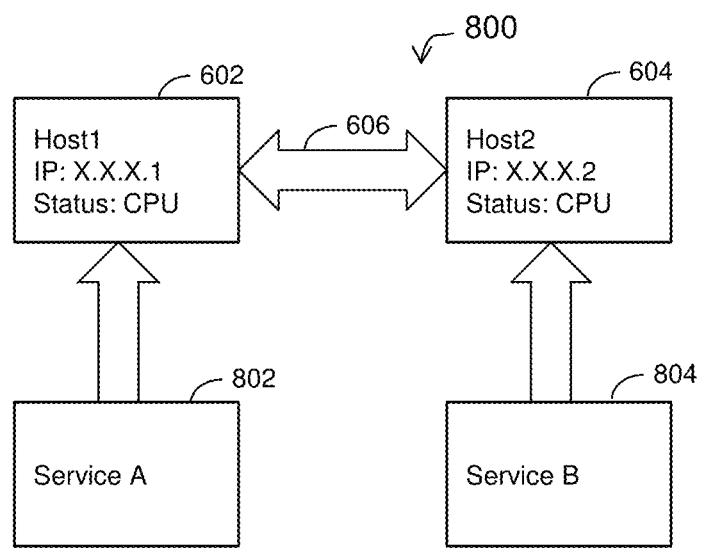

FIG. 8 illustrates a system 800 and provides Service A 802 is associated with Host1 602 and Service B 804 is associated with Host2 604. In one or more embodiments, the services can be operated on separate servers or can be operated on one or both hosts. The relationships between the services and respective hosts can be discovered using various requests such API requests.

Figure 9:
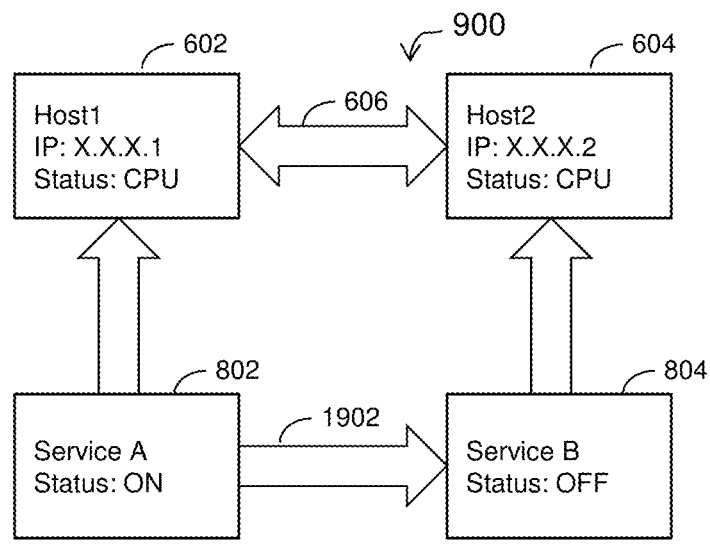

FIG. 9 illustrates a system 900. FIG. 9 provides software service status information associated with respective software services which can be obtained using various request types. In an embodiment, Service A 802 is shown to be dependent on Service B 804. Link 1902 illustrates the dependency between Service A 802 on Service B 804. In addition, the software service status information of Service A 802 indicates that it is in the ON state and Service B 804 is in the OFF state. As a result, Service A will be unavailable to a user as Service B is in the incorrect state.

Figure 10:
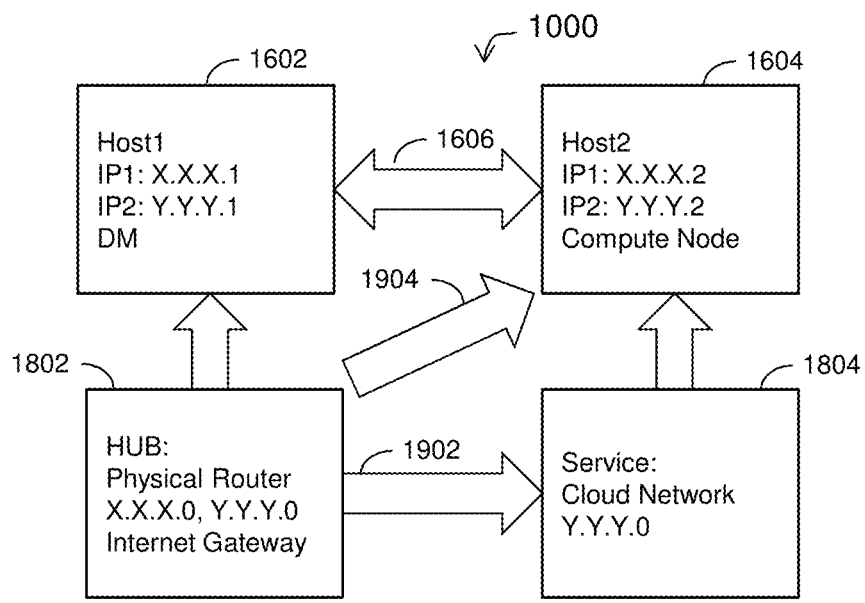

Now referring to FIG. 10, a system 1000 is shown. In the one or more embodiments, Host1 1602 is configured as Deployment Manager (DM) and Host2 1604 is configured as a compute node. Host1 1602 and Host2 1604 communication over network 1606. Hub 1802 is the main physical router and also functions as an Internet gateway. The HUB 1802 communicates using IP addresses X.X.X.0 and Y.Y.Y.0 through links 1902 and 1904. Service 1804 is configured as a cloud service and can operate on a separate server or can exist on Host2 1604. The system 1000 will be unable to provide a service to a cloud user if any of the components, services, connections, or relations between them is not synchronized and in the wrong state.

In order to provide a service, Host1 1602 has to be available to the other components via management network X.X.X.0 and further has to be able to initiate deployment of services. Host1 1602 must also be able to reach and communicate with machines in the virtual network Y.Y.Y.0. Host2 1604 has to be available to other components via management network X.X.X.0 and has to be able to spawn. Host2 1604 must also be able to communicate and reach machines in virtual network Y.Y.Y.0.

HUB 1802 defines network X.X.X.0 and allows both networks to access the Internet via the gateway. Service 1804 is responsible for defining the virtual network for any spawned machines. A rule definition can be formed from the combined relations and statuses received from the queries and protocols messages.

Host1 1602 communicates through network interface cards (NIC) and must be operational and accessible in the network configuration. Host2 1604 communicates through NICs and must be operational and accessible to the network. Additionally, HUB 1802 has to be operational and accessible and further has to be capable of redirecting communications from nodes to the Internet.

Service 1804 has to be in an ON state. In one or more embodiments, the status of the service can be discovered through API queries. In other embodiments, the server on which the service exists has to be operation and online. Host1 1602 operating as the DM has to be ON and Host2 operating as the Compute Node has to be in ON.

If the system collapses, such a defined rule allows for efficient identification of the source of failure on a related graph by showing which particular component or relation is not in the required state. An exemplary graph illustrating the previous configuration may be incorporated in to a graph of the following FIGS. 11 and 12.

Figure 11:
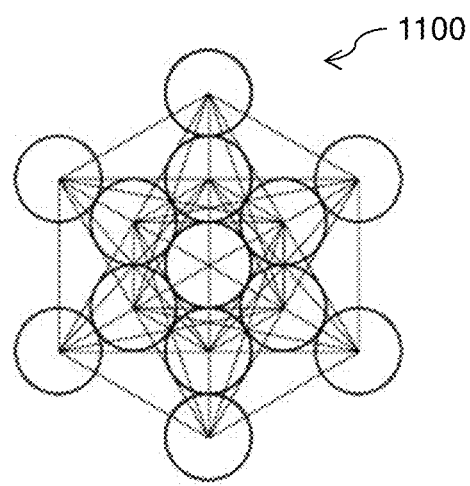

FIG. 11 depicts a topology graph 1100. Topology graph 1100 illustrates a plurality of graph nodes and associated connections between each of the plurality of graph nodes. Each circle represents a graph node for a software service or a hardware unit of an infrastructure, and the links between each graph node represents an association or relation between the graph nodes.

Figure 12:
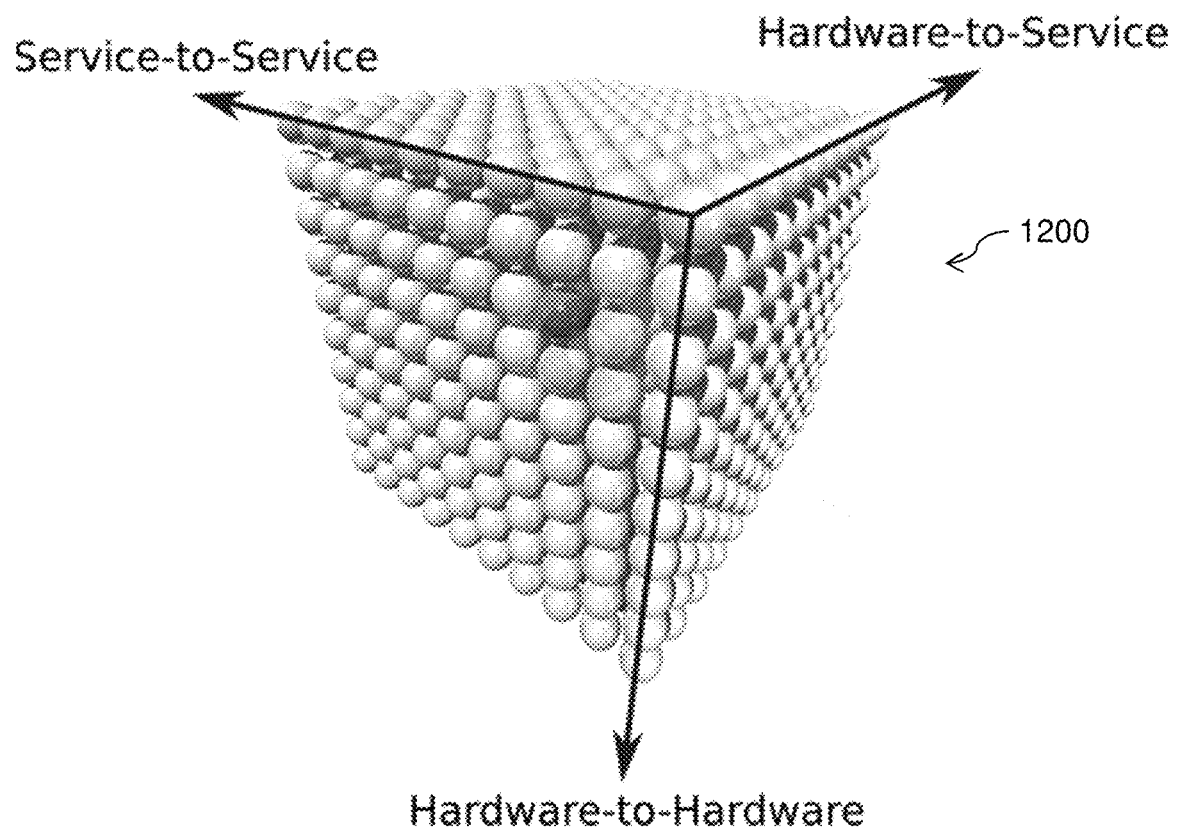
FIGS. 11 and 12 illustrate a topology graph in accordance with one or more embodiments.

FIG. 12 depicts a topology graph 1200. Topology graph 1200 provides an exemplary embodiment of a plurality of graph nodes. Graph nodes in the topology can be representative of either software service nodes or hardware units. The graph edges between the graph nodes represent an association between the graph nodes. The graph edges can further depict a dependent association between a software service graph node and another software service graph node, a dependent association between a hardware unit graph node and a software service graph node, or a dependent association between a hardware unit graph node and another hardware unit graph node. The topology graph 1200 illustrates an integrated view of the network having synchronized status information. In practice, each of the graph nodes will not necessarily be linked to each neighboring graph node.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identifying a source of a failure in a network, the method comprising:
    receiving hardware infrastructure information of the network, wherein the network includes a plurality of hardware infrastructure units;
    receiving software services information of the network, wherein the infrastructure information and the software services information are received by messages of a plurality of protocols;
    aggregating the messages of the plurality of protocols;
    forming a rule definition from the messages of the plurality of protocols;
    associating the hardware infrastructure information with the software services information;
    generating a graph based on the association of the hardware infrastructure information and the software services information, wherein the graph is generated based on detecting a change in at least one of an infrastructure or service;
    for each identified software service, computing an effective software service status information, wherein computing the effective software service status information includes computing a maximum spanning tree, wherein the computed maximum spanning tree is rooted at a graph node corresponding to the software service, wherein the effective software service status information includes an ON state indicating the software service is operational and available and includes an OFF state indicating the software service is unavailable or offline;
    traversing the graph nodes belonging to the computed maximum spanning tree;
    collecting status information from the graph nodes belonging to the computed maximum spanning tree;
    selecting the graph node having the status information with a highest severity for a software service and a hardware infrastructure unit; and
    identifying a source of failure on the graph based on the rule definition.

2. The method of claim 1, wherein the hardware infrastructure information is received from a hardware network monitoring system and the software service information is received from an Infrastructure-as-a-Service system application programming interface.

3. The method of claim 1, wherein the hardware infrastructure information includes hardware infrastructure data and hardware infrastructure status information.

4. The method of claim 1, wherein the generating the graph further comprises
    creating a graph node for each of the plurality hardware units identified in the hardware infrastructure of the network, wherein each graph node includes status information;
    creating a graph node for each piece of the software service information; and
    creating a graph edge between graph nodes of the identified hardware unit that are associated with graph nodes of the software services information.

5. The method of claim 1, further comprises creating a graph edge between graph nodes of the software services information that are dependent on other software services.

6. A computer program product for identifying a source of a failure in a network, the computer program product comprising a computer readable storage medium having program instructions embodied therewith, the program instructions executable by a processor to cause the to:
    receiving infrastructure information of the network, wherein the network includes a plurality of hardware infrastructure units;
    receiving software services information of the network, wherein the infrastructure information and the software services information are received by messages of a plurality of protocols;
    aggregating the messages of the plurality of protocols;
    forming a rule definition from the messages of the plurality of protocols;
    associating the hardware infrastructure information with the software services information;
    generating a graph based on the association of the hardware infrastructure information and the software services information, wherein the graph is generated based on detecting a change in at least one of an infrastructure or service;
    for each identified software service, computing an effective software service status information, wherein computing the effective software service status information includes computing a maximum spanning tree, wherein the computed maximum spanning tree is rooted at a graph node corresponding to the software service, wherein the effective software service status information includes an ON state indicating the software service is operational and available and includes an OFF state indicating the software service is unavailable or offline;

traversing the graph nodes belonging to the computed maximum spanning tree;

collecting status information from the graph nodes belonging to the computed maximum spanning tree;

selecting the graph node having the status information with a highest severity for a software service and a hardware infrastructure unit; and identifying a source of failure on the graph based on the rule definition.

7. The computer program product of claim 6, wherein the hardware infrastructure information is received from a hardware network monitoring system and the software service information is received from an Infrastructure-as-a-Service system application programming interface.

8. The computer program product of claim 6, wherein the hardware infrastructure information includes hardware infrastructure data and hardware infrastructure status information.

9. The computer program product of claim 6, wherein the generating the graph further comprises:

creating a graph node for each of the plurality hardware units identified in the hardware infrastructure of the network, wherein each graph node includes status information;

creating a graph node for each piece of the software services information; and creating a graph edge between graph nodes of the identified hardware unit that are associated with graph nodes of the software services information.

10. The computer program product of claim 6, further comprises creating a graph edge between graph nodes of the software services information that are dependent on other software services.

11. A system comprising:

a memory coupled to a processor, the processor being configured to:

receive hardware infrastructure information of the network;

receive software services information of the network, wherein the infrastructure information and the software services information are received by messages of a plurality of protocols;

aggregate the messages of the plurality of protocols;

form a rule definition from the messages of the plurality of protocols;

associate the hardware infrastructure information with the software services information;

generate a graph consolidating the hardware infrastructure information with the software services information, wherein the graph is generated based on detecting a change in at least one of an infrastructure or service;

for each identified software service, compute an effective software service status information, wherein computing the effective software service status information includes computing a maximum spanning tree, wherein the computed maximum spanning tree is rooted at a graph node corresponding to the software service, wherein the effective software service status information includes an ON state indicating the software service is operational and available and includes an OFF state indicating the software service is unavailable or offline;

traverse the graph nodes belonging to the computed maximum spanning tree;

collect status information from the graph nodes belonging to the computed maximum spanning tree;

select the graph node having the status information with a highest severity for a software service and a hardware infrastructure unit; and identify a source of failure on the graph based on the rule definition.

12. The system of claim 11, wherein the hardware infrastructure information is received from a hardware network monitoring system and the software service information is received from an Infrastructure-as-a-Service system application programming interface.

13. The system of claim 11, wherein the hardware infrastructure information includes hardware infrastructure data and hardware infrastructure status information.

14. The system of claim 11, wherein the generating the graph, processor is further configured to:

create a graph node for each of the plurality hardware units identified in the hardware infrastructure of the network, wherein each graph node includes status information;

create a graph node for each piece of the software service information; and create a graph edge between graph nodes of the identified hardware unit that are associated with graph nodes of the software services information.

15. The system of claim 11, the processor is further configured to create a graph edge between graph nodes of the software services information that are dependent on other software services.

* * * * *